(12) United States Patent
Tahara (10) Patent No.: US 11,378,510 B2
(45) Date of Patent: Jul. 5, 2022

(54) FINE PARTICLE MEASURING DEVICE AND FINE PARTICLE MEASURING METHOD (71) Applicant: SONY CORPORATION, Tokyo (JP)

(72) Inventor: Katsutoshi Tahara, Tokyo (JP)

(73) Assignee: SONY CORPORATION, Tokyo (JP)

(*) Notice: Subject to any disclaimer, the term of this patent is extended or adjusted under 35 U.S.C. 154(b) by 669 days.

(21) Appl. No.: 16/325,043

(22) PCT Filed: Jun. 27, 2017

(86) PCT No.: PCT/JP2017/023463
§ 371 (c)(1),
(2) Date: Feb. 12, 2019

(87) PCT Pub. No.: WO2018/047441
PCT Pub. Date: Mar. 15, 2018

(65) Prior Publication Data
US 2021/0285862 A1 Sep. 16, 2021

(30) Foreign Application Priority Data
Sep. 9, 2016 (JP) .............................. JP2016-177001

(51) Int. Cl.
*G01N 15/14* (2006.01)
*G01N 15/10* (2006.01)
*G01N 21/64* (2006.01)

(52) U.S. Cl.
CPC ..... *G01N 15/1012* (2013.01); *G01N 15/1459* (2013.01); *G01N 21/64* (2013.01); *G01N 2015/1018* (2013.01)

(58) Field of Classification Search
CPC ........... G01N 15/1012; G01N 15/1459; G01N 21/64; G01N 2015/1018
See application file for complete search history.

(56) References Cited

U.S. PATENT DOCUMENTS

| 5,041,733 A | 8/1991 | Noguchi et al. |
| 2008/0213915 A1 | 1/2008 | Polidoro et al. |

(Continued)

FOREIGN PATENT DOCUMENTS

| CN | 104067105 A | 9/2014 |
| CN | 105393104 A | 3/2016 |

(Continued)

OTHER PUBLICATIONS

Office Action for JP Patent Application No. 2018-538037 dated Oct. 6, 2020, 03 pages of Office Action and 03 pages of translation.

(Continued)

*Primary Examiner* — Mark R Gaworecki
(74) *Attorney, Agent, or Firm* — Chip Law Group (57) ABSTRACT

Provided is a fine particle measuring device and the like at least including at least two light sources having different wavelength region, a detection unit that detects light from a fluorescent reference particle in accordance with excitation light from the light sources, and an information processing unit that compares, on the basis of information detected by the detection unit, a feature quantity of an output pulse based on a reference light source among the plurality of light sources with a feature quantity of an output pulse based on at least another light source among the plurality of light sources, and adjusts an output of the another light source.

17 Claims, 5 Drawing Sheets (56) References Cited

U.S. PATENT DOCUMENTS

| | | | |
|---|---|---|---|
| 2011/0196637 A1* | 8/2011 | Sharpe | G01N 15/1429 |
| | | | 702/104 |
| 2015/0138550 A1 | 5/2015 | Spriggs et al. | |
| 2015/0153223 A1* | 6/2015 | Onishi | H01J 37/244 |
| | | | 250/214 A |
| 2016/0161393 A1 | 6/2016 | Tahara | |

FOREIGN PATENT DOCUMENTS

| | | |
|---|---|---|
| EP | 2756283 A1 | 7/2014 |
| EP | 3026418 A1 | 6/2016 |
| GB | 2494733 A | 3/2013 |
| JP | 63-233371 A | 9/1988 |
| JP | 2003-083894 A | 3/2003 |
| JP | 2009-097902 A | 5/2008 |
| JP | 2009-097902 A | 5/2009 |
| JP | 2010-022315 A | 2/2010 |
| JP | 2010-281842 A | 12/2010 |
| JP | 2014-530349 A | 11/2014 |
| WO | 2013/038160 A1 | 3/2013 |
| WO | 2015/012004 A1 | 1/2015 |

OTHER PUBLICATIONS

International Search Report and Written Opinion of PCT Application No. PCT/JP2017/023463, dated Oct. 3, 2017, 09 pages of ISRWO.

* cited by examiner

FINE PARTICLE MEASURING DEVICE AND FINE PARTICLE MEASURING METHOD

CROSS REFERENCE TO RELATED APPLICATIONS

This application is a U.S. National Phase of International Patent Application No. PCT/JP2017/023463 filed on Jun. 27, 2017, which claims priority benefit of Japanese Patent Application No. JP 2016-177001 filed in the Japan Patent Office on Sep. 9, 2016. Each of the above-referenced applications is hereby incorporated herein by reference in its entirety.

TECHNICAL FIELD

The present technology relates to a fine particle measuring device or the like for optically measuring characteristics of fine particles. More specifically, the present invention relates to a fine particle measuring device and a fine particle measuring method for optically measuring characteristics of fine particles such as cells.

BACKGROUND ART

In recent years, with the development of analytical methods, there has been used a method of allowing biological fine particles such as cells and microorganisms, fine particles such as microbeads, and the like to flow through a passage, and, in the step of allowing the flow, individually measuring fine particles and the like, and analyzing or separating the measured fine particles and the like.

As one representative example of such a technique, technical improvement of an analytical method called flow cytometry is rapidly progressing. Flow cytometry is an analytical method of analyzing and separating fine particles by detecting fluorescence and scattered light emitted from each fine particle, by pouring fine particles to be analyzed in a state of being aligned in a fluid and irradiating the fine particles with laser light or the like. A device used for this flow cytometry is called a flow cytometer.

For example, in a case of detecting fluorescence of a cell, excitation light having an appropriate wavelength and intensity, such as laser light, is irradiated to a cell labeled with a fluorescent dye. Then, fluorescence emitted from the fluorescent dye is collected by a lens or the like, light having an appropriate wavelength region is selected with use of a wavelength selection element such as a filter or a dichroic mirror, and the selected light is detected with use of a light receiving element such as a photo multiplier tube (PMT). At this time, it is also possible to simultaneously detect and analyze fluorescence from a plurality of fluorescent dyes labeled on a cell, by combining a plurality of wavelength selection elements and light receiving elements. Moreover, it is also possible to increase the number of fluorescent dyes that can be analyzed, by combining excitation light of plural wavelengths.

For fluorescence detection in flow cytometry, in addition to a method of selecting a plurality of lights having discontinuous wavelength regions with use of a wavelength selection element such as a filter and measuring intensity of light in each wavelength region, there is also a method of measuring intensity of light in a continuous wavelength region as a fluorescence spectrum. In spectral flow cytometry capable of measuring a fluorescence spectrum, fluorescence emitted from a fine particle is dispersed with use of a spectroscopic element such as a prism or a grating. Then, the dispersed fluorescence is detected with use of a light receiving element array arranged with a plurality of light receiving elements having different detection wavelength regions. For the light receiving element array, there is used a PMT array or a photodiode array in which light receiving elements such as PMTs and photodiodes are arranged one dimensionally, or a CCD, a CMOS, or the like in which a plurality of independent detection channels such as two-dimensional light receiving elements are arranged.

In analysis of fine particles represented by flow cytometry and the like, there are often used an optical method of irradiating a fine particle to be analyzed with light such as laser, and detecting fluorescence or scattered light emitted from the fine particle. Then, on the basis of the detected optical information, a histogram is extracted by an analysis computer and software, and analysis is performed.

In optical analysis of fine particles, there is a case where quality control (QC) is performed for verification of precision and the like, and for operation confirmation, standardization, and the like of the device, before optical measurement of the fine particles to be actually tested. In this quality control, there are typically used a plurality of beads (for example, three peak beads, six peak beads, eight peak beads) and the like labeled with a fluorescent dye having different fluorescence intensities, one type of beads (for example, Align Check Beads, Ultra Rainbow fluorescent particles, and the like) that can obtain a wide range of a spectrum, and the like.

As a technique for performing fluorescence correction in performing measurement of fluorescence between a plurality of fluorescent dyes or with use of a plurality of laser beams, for example, Patent Document 1 has proposed a program in which a centroid value of a fluorescent group related to a fluorescent-labeled test cell is calculated from a two-dimensional correlation diagram of the fluorescent-labeled test cell obtained by a flow cytometer, and correction calculation of a fluorescence value is performed with use of a fluorescence value of a fluorescent-labeled test cell corresponding to the centroid value and a predetermined determinant.

CITATION LIST

Patent Document

Patent Document 1: Japanese Patent Application Laid-Open No. 2003-83894

SUMMARY OF THE INVENTION

Problems to be Solved by the Invention

However, a light source used for the flow cytometer has an output difference due to individual differences, and an output difference may be caused by a change with time even in the same individual. As a result, an output level of the light source becomes inconstant between different devices or in a same device, and measurement data is also affected by these influences to cause a level difference, leading to a decrease and the like in compatibility of measurement data.

In view of the above, a main object of the present technology is to provide a technique for adjusting an output difference of a light source with high accuracy in fine particle measurement for optically measuring characteristics of fine particles.

Solutions to Problems

In other words, the present technology provides a fine particle measuring device at least including: first, at least two light sources having different wavelength regions; a detection unit configured to detect light from a fluorescent reference particle in accordance with excitation light from the light sources; and an information processing unit configured to compare, on the basis of information detected by the detection unit, a feature quantity of an output pulse based on a reference light source among the plurality of light sources with a feature quantity of an output pulse based on at least another light source among the plurality of light sources, and adjust an output of the another light source.

In the present technology, the light source may be a laser.

Furthermore, in the present technology, the reference light source may be a laser for detection of scattered light.

Moreover, in the present technology, the detection unit may have a plurality of channels, and a feature quantity of an output pulse detected in a channel having a largest S/N ratio among the plurality of channels may be used as a feature quantity of the output pulse.

In addition, in the present technology, the information processing unit may adjust an output of the another light source on the basis of a preset adjustment ratio of feature quantities of the output pulses of the reference light source and the another light source.

In the present technology, the information processing unit may determine whether or not an output value after output adjustment is valid. In this case, the information processing unit may determine whether or not the output value is valid on the basis of a preset adjustment ratio of feature quantities of the output pulses of the reference light source and the another light source. Furthermore, the fine particle measuring device according to the present technology may further include a storage unit, and the storage unit may store information of the output value in a case where the output value after output adjustment is valid. Moreover, the information processing unit may adjust an output of the another light source again in a case where the output value after output adjustment is not valid.

Furthermore, in the present technology, in a case where an output of the another light source has been changed, the information processing unit may interrupt detection with the detection unit until the another light source is stabilized.

Moreover, the fine particle measuring device according to the present technology may further include a display unit, and the display unit may display a state of output adjustment in the information processing unit.

In addition, in the present technology, a feature quantity of the output pulse may be an area of an output pulse or a height of an output pulse.

Furthermore, the present technology also provides a fine particle measuring method of at least performing: a detection step of detecting light from a fluorescent reference particle in accordance with excitation light from at least two light sources having different wavelength regions; and an information processing step of comparing, on the basis of information detected by the detection unit, a feature quantity of an output pulse based on a reference light source among a plurality of light sources with a feature quantity of an output pulse based on at least another light source among the plurality of light sources, and adjusting an output of the another light source.

In the information processing step in the present technology, it is also possible to adjust an output of the another light source on the basis of a preset adjustment ratio of feature quantities of the output pulses of the reference light source and the another light source.

Furthermore, in the information processing step in the present technology, it is also possible to determine whether or not an output value after output adjustment is valid. In this case, in the information processing step, it is also possible to determine whether or not the output value is valid on the basis of a preset adjustment ratio of feature quantities of the output pulses of the reference light source and the another light source. Furthermore, in the information processing step, it is also possible to adjust an output of the another light source again in a case where the output value after output adjustment is not valid.

Moreover, in the information processing step in the present technology, shifting to the detection step may not be performed until the another light source is stabilized, in a case where an output of the another light source has been changed.

In the present technology, "fine particles" broadly include: bio-related fine particles such as cells, microorganisms, and liposomes; synthetic particles such as latex particles, gel particles, and industrial particles; and the like.

The bio-related fine particles include chromosomes, liposomes, mitochondria, organelles (cell organelles), and the like constituting various cells. The cells include animal cells (for example, hematopoietic cells and the like) and plant cells. The microorganisms include bacteria such as *Escherichia coli*, viruses such as tobacco mosaic virus, fungi such as yeast, and the like. Moreover, the bio-related fine particles also include bio-related polymers such as nucleic acids, proteins, and composites of these. Furthermore, the industrial particles may be, for example, an organic or inorganic polymer material, a metal, or the like. The organic polymer material includes polystyrene, styrene/divinylbenzene, polymethyl methacrylate, or the like. The inorganic polymer material includes glass, silica, a magnetic material, or the like. The metal includes gold colloid, aluminum, or the like. In general, shapes of these fine particles are normally spherical, but may be non-spherical in the present technology, while its size, mass, and the like are also not particularly limited.

Effects of the Invention

According to the present technology, in fine particle measurement for optically measuring characteristics of fine particles, an output difference of the light source can be adjusted with high accuracy. Note that the effects described herein are not necessarily limited, and any of the effects described in the present disclosure is possible.

MODE FOR CARRYING OUT THE INVENTION

Preferred embodiments for implementing the present technology will be described below with reference to the drawings. The embodiments described below show one example of a representative embodiment of the present technology, and do not cause the scope of the present technology to be narrowly interpreted. Note that the description will be given in the following order.
1. Fine particle measuring device 1
(1) Light source 11
(2) Detection unit 12
(3) Information processing unit 13
[One Example of Output Difference Adjustment Method]
[One Example of Output Difference Adjustment Result]
(4) Separation unit 14
(5) Storage unit 15
(6) Passage P
(7) Display unit 16
[One Example of Display]
(8) User interface 17
(9) Other
2. Fine particle measuring method
<1. Fine Particle Measuring Device 1>

Figure 1:
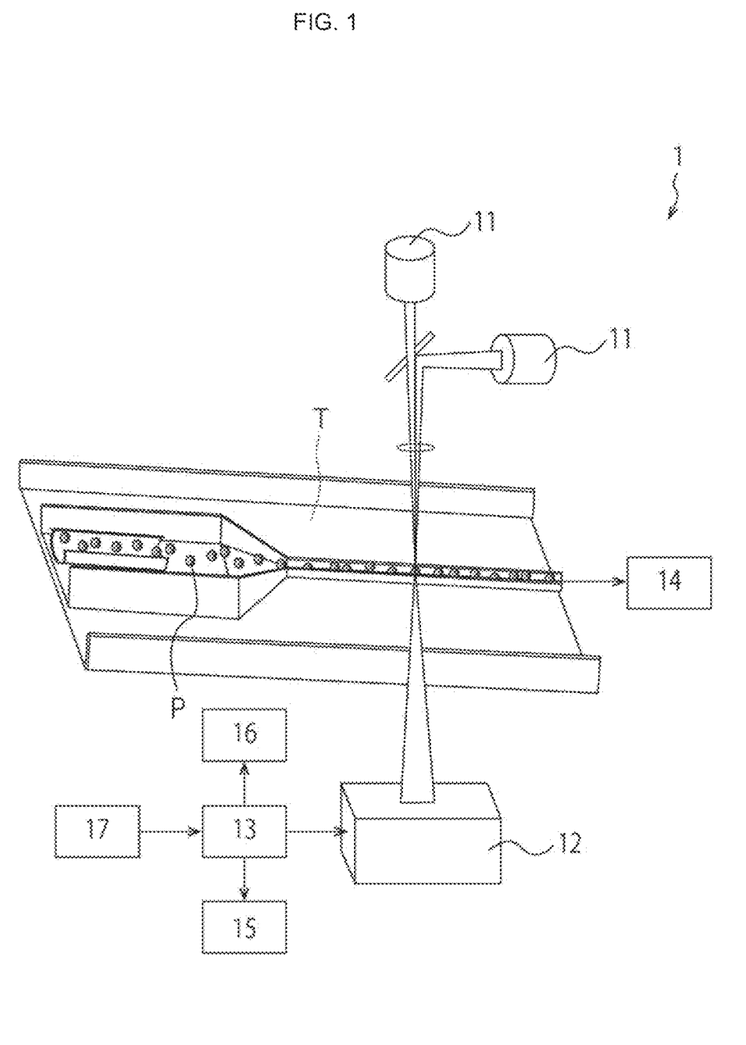
FIG. 1 is a schematic conceptual view schematically showing a first embodiment of a fine particle measuring device 1 according to the present technology.
Figure 2:
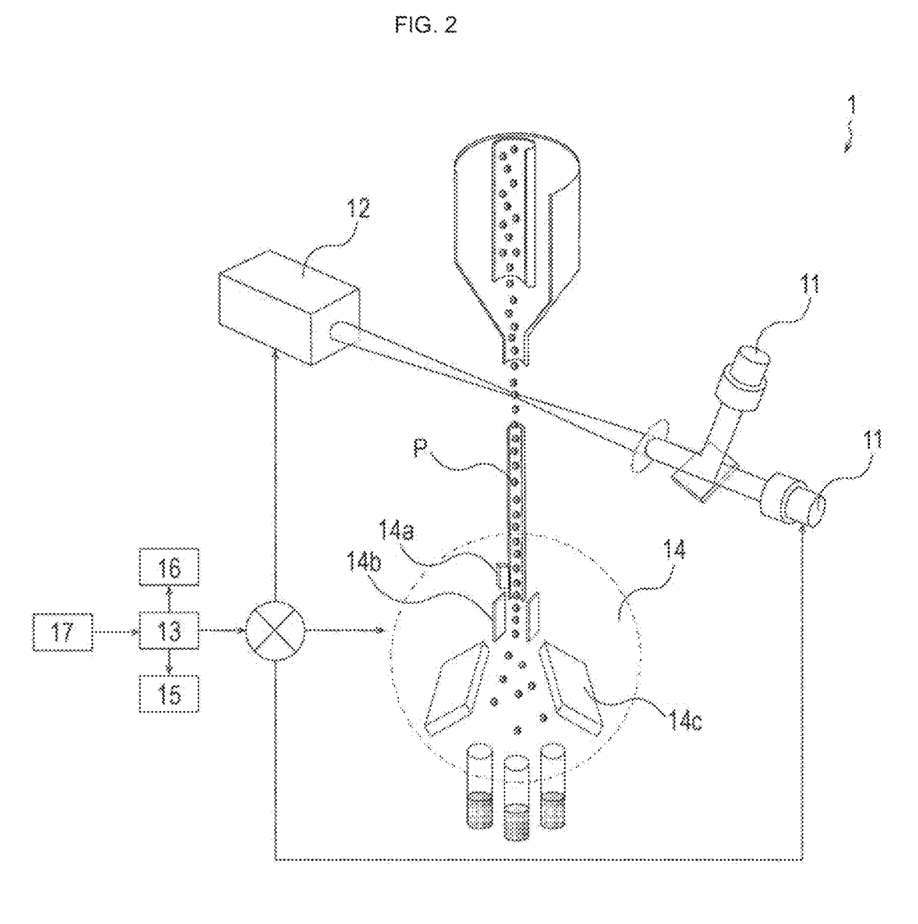
FIG. 2 is a schematic conceptual view schematically showing a second embodiment of a fine particle measuring device 1 according to the present technology.

FIG. 1 is a schematic conceptual view schematically showing a first embodiment of a fine particle measuring device 1 according to the present technology, and FIG. 2 is a schematic conceptual view schematically showing a second embodiment of a fine particle measuring device 1 according to the present technology. The fine particle measuring device 1 according to the present technology is a device for optically measuring characteristics of fine particles, and includes at least a light source 11, a detection unit 12, and an information processing unit 13. Furthermore, if necessary, there may be provided a separation unit 14, a storage unit 15, a passage P, a display unit 16, a user interface 17, and the like. Each unit will be described in detail below.

(1) Light Source 11

The fine particle measuring device 1 according to the present technology has at least two light sources 11 having different wavelength regions. The light source 11 irradiates fluorescent reference particles or fine particles with light. In the present technology, the light source 11 includes a reference light source and at least another light source, and the number thereof is not particularly limited as long as there are at least two or more. Furthermore, each wavelength region of the light source 11 is also not particularly limited, and can be freely set.

Note that FIGS. 1 and 2 show a fine particle measuring device installed with a plurality of coaxial light sources 11, but the present technology can also be applied to a fine particle measuring device installed with a plurality of light sources 11 with different axes.

Furthermore, a type of light emitted from the light source 11 is not particularly limited, but light having a constant light direction, wavelength, and light intensity is preferable in order to reliably generate fluorescence or scattered light from particles. Specifically, for example, a laser, an LED, and the like can be mentioned, and the light source 11 is preferably a laser in the present technology. In a case of using a laser, a type thereof is not particularly limited, but it is possible to freely combine and use one kind or two or more kinds of an argon ion (Ar) laser, a helium-neon (He—Ne) laser, a dye laser, a krypton (Cr) laser, a semiconductor laser, a solid laser in which a semiconductor laser and a wavelength conversion optical element are combined, or the like.

Furthermore, the reference light source is preferably a laser for detection of scattered light. This configuration allows a trigger to be applied by scattering, and can provide measurement data at a stable level. Furthermore, in a case of using the procedure (b) as described later, it is possible to easily obtain an output of another light source.

(2) Detection Unit 12

The detection unit 12 detects light from a fluorescent reference particle that emits fluorescence with a predetermined wavelength region width, in accordance with excitation light from the light source 11. Furthermore, light from a fine particle can also be detected.

A type of the detection unit 12 is not particularly limited as long as light from a fluorescent reference particle can be detected, and a publicly known photodetector can be appropriately selected. For example, it is possible to freely combine and adopt one kind or two or more kinds of a fluorescence measuring instrument, a scattered light measuring instrument, a transmitted light measuring instrument, a reflected light measuring instrument, a diffracted light measuring instrument, an ultraviolet spectrometer, an infrared spectrometer, a Raman spectrometer, a FRET measuring instrument, a FISH measuring instrument, various other spectrum measuring instruments, a so-called multichannel photodetector in which a plurality of photodetectors are arranged in an array form, and the like.

In the present technology, it is possible to include an area image sensor such as a CCD or a CMOS element, a PMT, a photodiode, and the like as the detection unit 12, but including the PMT as the detection unit 12 is particularly preferable among them.

In the present technology, the detection unit 12 is preferably configured with a plurality of light receiving elements having different detection wavelength regions. Configuring the detection unit 12 with a plurality of light receiving elements having different detection wavelength regions enables measurement of intensity of light in a continuous wavelength region as a fluorescence spectrum. Specifically, for example, a PMT array or a photodiode array in which light receiving elements are arranged one dimensionally, or a CCD, a CMOS, or the like in which a plurality of independent detection channels such as two-dimensional light receiving elements are mentioned. However, among them, configuring the detection unit 12 with a plurality of PMTs is particularly preferable.

An installation location of the detection unit 12 in the fine particle measuring device 1 is not particularly limited and can be freely designed, as long as light from a fluorescent reference particle can be detected. For example, as shown in FIGS. 1 and 2, arrangement on a side opposite to the light source 11 with the passage P in between is preferable. Furthermore, since the fluorescence is also emitted in a direction different from an incident direction of the irradiation light, the detection unit 12 can also be installed on the same side as the light source 11 or on a side of a side face of about 90° with the passage P as a reference, in the present technology.

(3) Information Processing Unit 13

The information processing unit 13 performs various kinds of information processing, various analyses, and controls of the light source 11, the detection unit 12, the separation unit 14, the storage unit 15, the display unit 16, the user interface 17, and the like. Specifically, as information processing, on the basis of the information detected by the detection unit 12, a feature quantity of an output pulse based on a reference light source among a plurality of light sources 11 is compared with a feature quantity of an output pulse based on at least another light source, and an output of the another light source is adjusted.

Conventionally, there has been an output difference of a light source between different devices and a same device, and this output difference causes a difference to appear in measurement data. This affects standardization of a device and reproducibility of data in the device. Furthermore, deterioration and a change with time of optical components including a flow cell may cause a change of an output state of the light source and measurement data of fluorescence. This results in deterioration of compatibility of data and causes necessity of acquiring basic data every time, leading to increase of sample preparation and man-hour therefor. Moreover, in a case where the light source is a laser, a spot shape thereof also varies depending on the output difference.

Furthermore, while output calibration of the light source is performed regularly in accordance with a maintenance contract and the like, its contents are often only checking and adjusting a total light quantity of the light source incident on the flow cell so as to fulfill a certain standard, for example. In such a case, if there is a difference in a spot shape and setting, a same signal level cannot be obtained from a sample even if output calibration is performed, and the output value may vary even within a calibration standard.

On the other hand, in the present technology, an output difference of the light source can be adjusted by performing the above-described information processing. As a result, it is possible to obtain effects such as: (i) a level of fluorescence can be kept equal in a same device, and reproducibility of data becomes higher; (ii) a level of fluorescence can be kept equal between different devices, and comparison of data can be easier even for measurement data of different devices; and (iii) use of same reference data becomes easier between different devices or a same device.

A feature quantity of the output pulse is not particularly limited, but in the present technology, a height of an output pulse or an area of an output pulse is preferable, and an area of an output pulse is more preferable. This configuration enables adjustment of an output difference of the plurality of light sources 11 with higher accuracy. Furthermore, in the present technology, a median or an average value of these values can be used. Among them, it is preferable to use an Area Median value (a median value of an area of an output pulse) or Height Median value (a median value of a height of an output pulse), and it is more preferable to use the Area Median value.

Furthermore, in a case where the detection unit 12 has a plurality of channels, it is preferable to use a feature quantity of an output pulse detected in a channel having a largest S/N ratio among the plurality of channels, as a feature quantity of the output pulse. This configuration enables adjustment of an output difference of the plurality of light sources 11 with higher accuracy.

As the fluorescent reference particle that can be used in the present technology, for example, a particle that emits fluorescence and the like with a predetermined wavelength region can be mentioned. As this fluorescent reference particle, in the present technology, it is possible to appropriately and freely select a particle that emits fluorescence having a wavelength region corresponding to a type of the light source 11 and the detection unit 12, a type of fine particles to be measured, a purpose of measurement, and the like.

Specifically, a specific example of the fluorescent reference particle is, for example, Align Check Beads, Ultra Rainbow fluorescent particles, or the like. A condition for being allowed to be used as the fluorescent reference particle includes being capable of providing a sufficient fluorescence intensity in a wavelength region of the light source to be corrected, and the like. Furthermore, for example, particles such as beads labeled with a fluorescent dye can be used. As a fluorescent dye usable in the present technology, for example, it is possible to freely combine and use one kind or two or more kinds of Cascade Blue, Pacific Blue, fluorescein isothiocyanate (FITC), phycoerythrin (PE), propidiumiodide (PI), Texas red (TR), peridinin chlorophyll protein (PerCP), allophycocyanin (APC), 4', 6-diamidino-2-phenylindole (DAPI), Cy3, Cy5, Cy7, and the like.

In a case where the detection unit 12 is configured with a plurality of light receiving elements having different detection wavelength regions, a wavelength region width of fluorescence emitted from a fluorescent reference particle preferably covers at least a part of each of the detection wavelength regions of the plurality of light receiving elements, and preferably covers the whole. For example, in a case of a general flow cytometer, a particle that emits fluorescence having a wavelength region width of 400 to 800 nm is preferably selected.

On the basis of the information detected by the detection unit 12, as a method of comparing a feature quantity of an output pulse based on a reference light source among a plurality of light sources 11 with a feature quantity of an output pulse based on at least another light source, any method can be freely used as appropriate in accordance with a type of the light source 11 and the detection unit 12, a type of fine particles to be measured, a purpose of measurement, and the like. Specifically, for example, a method of comparing on the basis of the Area Median value obtained from a fluorescent reference particle and the like can be mentioned. Hereinafter, a specific method will be described with examples.

[One Example of Output Difference Adjustment Method]

(a) The reference light source (hereinafter also referred to as "LD_S") is lighted and taken on 2,000 events. In an FSC-SSC plot, Auto Gate is applied to acquire a Singlet, and an Area Median value: an X value, in a specific channel (hereinafter also referred to as "Ch_N"), is calculated. In the present technology, in a case where the detection unit 12 has a plurality of channels, a channel with a highest S/N ratio is preferably selected as this specific channel.

Figure 3A:
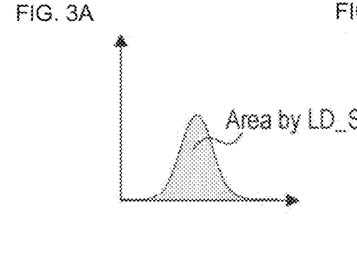
FIG. 3A is a view showing an Area in lighting only a reference light source.
Figure 3B:
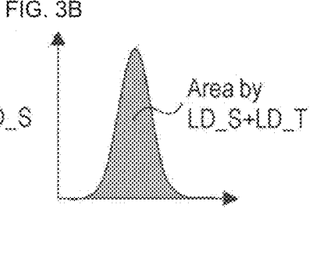
FIG. 3B is a view showing an Area in lighting both the reference light source and an another light source.
Figure 3C:
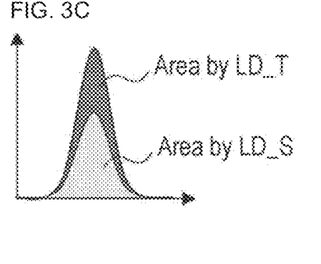
FIG. 3C is a view showing a breakdown of the Area shown in FIG. 3B.

(b) Both the LD_S and another light source (hereinafter also referred to as "LD_T") are lighted and taken on 2,000 events. In an FSC-SSC plot, Auto Gate is applied to acquire a Singlet, and an Area Median value: a Sum M value, in the Ch_N, is calculated. Then, the X value is subtracted from the Sum M value, and the Area Median value: a Y value, derived only from the LD_T, is calculated. Here, FIG. 3A is a view showing an Area in lighting only the reference light source, FIG. 3B is a view showing an Area in lighting both the reference light source and the another light source, and FIG. 3B is a view showing a breakdown of the Area shown in FIG. 3C. As shown in FIGS. 3A, 3B, and 3C, the Area is an addition value. Therefore, when both the reference light source and the another light source are lighted, an output derived only from the another light source can be easily obtained with an output difference of these.

Note that the calculation method of the Y value described above is used in a case where the LD_S and the LD_T are coaxially installed on the fine particle measuring device 1. In a case where the LD_S and the LD_T are installed with different axes, the Area Median value in the Ch_N obtained in a section of the LD_T is used as the Y value.

(c) It is determined whether or not a current output value of the LD_T is valid. Specifically, for example, it is determined whether or not the output is within an adjustment standard, on the basis of a criterion represented by the following formula (1).

[Expression 1]

$$1.000 - b < \frac{Y}{X} \div a < 1.000 + b \quad (1)$$

a: Preset adjustment ratio of feature quantities of output pulses of reference light source and another light source
b: Adjusted standard value Note that, in the present technology, the value a and the value b in the above formula (1) can be appropriately and freely set in accordance with a type of the light source and the like to be used.

In a case of being within the adjustment standard, the current output value in the LD_T is determined to be valid, and output adjustment of the LD_T is terminated. At that time, information of the output value that is valid may be stored in the storage unit 15 as described later.

On the other hand, in a case of being out of the adjustment standard range, the current output value of the LD_T is determined to be not valid, the output of the LD_T is changed, and further output adjustment is performed.

In the present technology, at this time, for example, it may be determined whether or not a current output value of the LD_T is within a range of an output upper limit standard value (Pmax) as shown by the following formula (2).

[Expression 2]

$$\text{Current output value of LD\_T} \times a \div \frac{Y}{X} < P\text{max} \quad (2)$$

a: Preset adjustment ratio of feature quantities of output pulses of reference light source and another light source
Pmax: Output upper limit standard value Note that, in the present technology, the value a and the Pmax in the above formula (2) can be appropriately and freely set in accordance with a type and the like of the light source to be used.

Thereafter, when it can be confirmed that the current output value of the LD_T is smaller than the Pmax, for example, the output of the LD_T is changed on the basis of the preset adjustment ratio: the value a, of feature quantities of output pulses of the LD_S and the LD_T.

[Expression 3]

New output value of LD_T =

$$\text{Current output value of LD\_T} \times a \div \frac{Y}{X} \quad (3)$$

a: Preset adjustment ratio of feature quantities of output pulses of reference light source and another light source Note that, in the present technology, the value a in the above formula (3) can be appropriately and freely set in accordance with a type and the like of the light source to be used.

Furthermore, in the present technology, in a case where an output of the LD_T has been changed, detection by the detection unit 12 may be interrupted until the LD_T is stabilized. This configuration can provide measurement data in a state where the LD_T is stabilized, improving measurement accuracy.

(d) In a case where there is another light source in addition to the LD_T, (b) and (c) are performed on the corresponding light source to perform output adjustment similarly to the LD_T.

[One Example of Output Difference Adjustment Result]

Figure 4A:
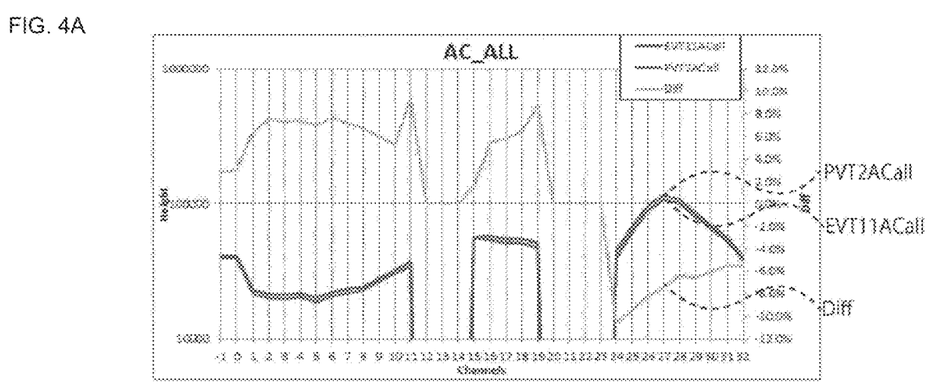
FIG. 4A is a view showing a result in a case where output adjustment has not been performed.
Figure 4B:
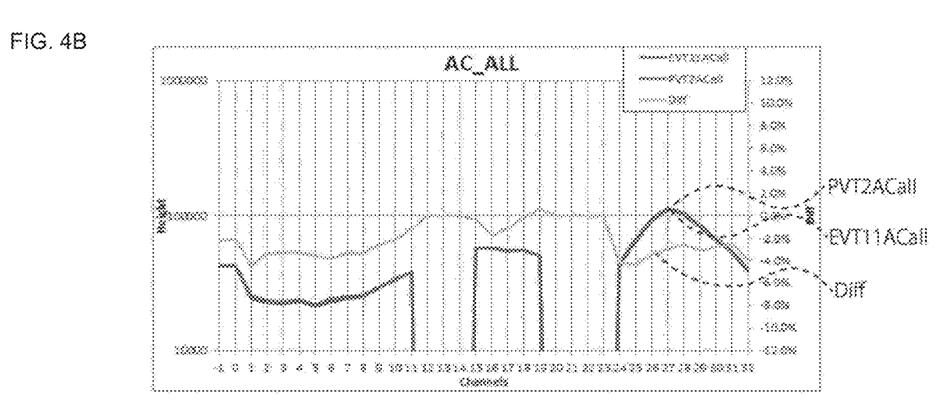
FIG. 4B is a view showing a result in a case where output adjustment has been performed in accordance with procedures of (a) to (d).

FIG. 4A is a view showing a result in a case where output adjustment (laser power calibration: LPC) of the light source has not been performed, and FIG. 4B is a view showing a result in a case where output adjustment of the light source has been performed in accordance with procedures of (a) to (d). In FIGS. 4A and 4B, "EVT11Acall" and "PVT2Acall" are examples of an individual name of the fine particle measuring device 1, and "Diff" indicates an output difference between the both. Note that, four light sources are installed in each device (EVT11ACall and PVT2ACall).

As shown in FIG. 4A, a deviation of −10.6% at maximum occurs in the output difference between the two devices in a case where output adjustment has not been performed, but the output difference between both devices has been improved to −4.4% at maximum in a case where output adjustment has been performed, as shown in FIG. 4B.

(4) Separation Unit 14

The fine particle measuring device 1 according to the present technology may further include a separation unit 14 configured to separate fine particles. In the separation unit 14, separation of fine particles is performed on the basis of spectrum data generated by correcting, with the information processing unit 13, a value detected by the detection unit 12. Furthermore, on the basis of an analysis result of a size, a form, an internal structure, and the like of the fine particles analyzed from the spectrum data, the separation unit 14 can perform separation of the fine particles at downstream of the passage P.

Specifically, for example, as shown in FIG. 2, a droplet is generated from a discharge port of the passage P by applying vibration to all or a part of the passage P with use of a vibration element 14a or the like that vibrates at a predetermined frequency. Note that, in this case, the vibration element 14a to be used is not particularly limited, and any publicly known vibrating element can be appropriately and freely selected. As one example, a piezo vibration element or the like can be mentioned. Furthermore, a droplet containing fine particles by a fixed amount can be generated by adjusting a size of the droplet by adjusting a liquid feed amount to the passage P, a diameter of the discharge port, a vibration frequency of the vibration element, and the like.

Next, on the basis of an analysis result of the size, the form, the internal structure, and the like of the fine particles analyzed on the basis of the spectral data corrected and generated by the information processing unit 13, a positive or negative charge is charged (refer to symbol 14b in FIG. 2). Then, the charged droplet, whose path is changed to a desired direction by a counter electrode 14c applied with a voltage, is separated.

(5) Storage Unit 15

The fine particle measuring device 1 according to the present technology can further include a storage unit 15. In a case where an output value after output adjustment is valid, the storage unit 15 stores information of the output value. Furthermore, it is also possible to store any other items related to measurement, such as a value detected by the detection unit 12, spectrum data generated by the information processing unit 13, a reference spectrum of each channel, and an analysis result.

The fine particle measuring device 1 does not necessarily require the storage unit 15, and may be connected with an external storage device. As the storage unit 15, for example, a hard disk or the like can be used.

(6) Passage P

The fine particle measuring device 1 according to the present technology can further include a passage P. The fine particle measuring device 1 according to the present technology can analyze and separate fine particles by detecting optical information obtained from fine particles aligned in one line in a flow cell (passage P).

While the passage P may be provided in advance in the fine particle measuring device 1, analysis or separation may also be performed by installing a commercially available passage P or a disposable chip or the like provided with a passage P, in the fine particle measuring device 1.

A form of the passage P is also not particularly limited, and can be freely designed. For example, it is not limited to the passage P formed in a substrate T such as two-dimensional or three-dimensional plastic or glass as shown in FIG. 1, a passage P used in a conventional flow cytometer can also be applied to the fine particle measuring device 1 according to the present technology, as shown in FIG. 2.

Furthermore, a passage width, a passage depth, and a passage cross-sectional shape of the passage P are also not particularly limited and can be freely designed as long as they have a form that can form a laminar flow. For example, a micro-passage having a passage width of 1 mm or less can also be used for the fine particle measuring device 1. In particular, a micro-passage having a passage width of about 10 μm or more to 1 mm or less is suitable for the fine particle measuring device 1 according to the present technology.

(7) Display Unit 16

The fine particle measuring device 1 according to the present technology can further include a display unit 16. The display unit 16 displays a state of output adjustment in the information processing unit 13. Specific displays will be described below with examples.

[One Example of Display]

Figure 5A:
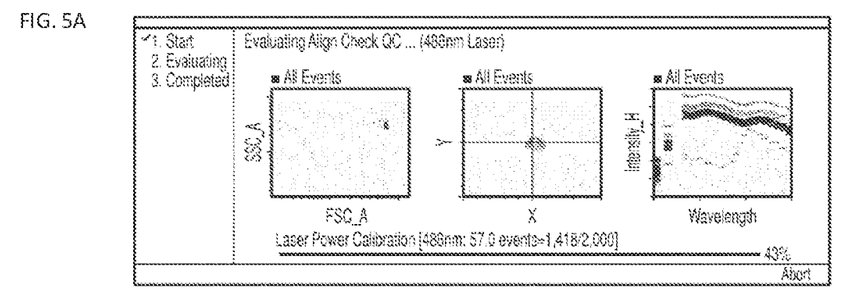
FIGS. 5A, 5B, 5C, and 5D are views showing one example of display on a display unit 16.
Figure 5B:
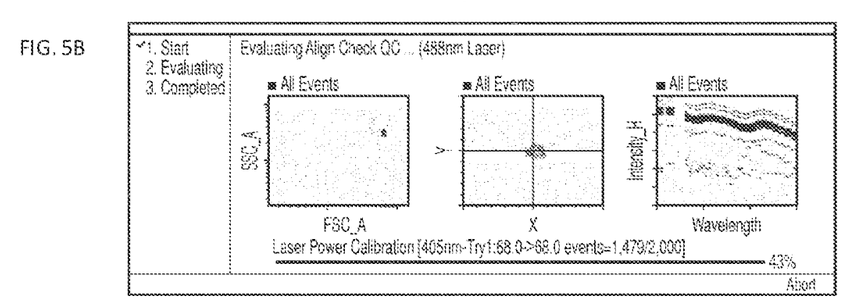
Figure 5C:
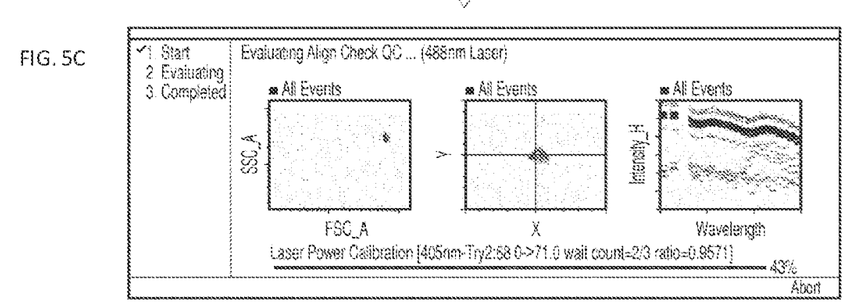
Figure 5D:
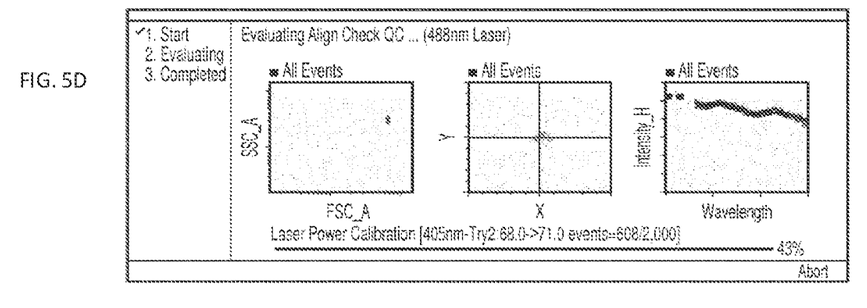

FIGS. 5A, 5B, 5C, and 5D are views showing one example of display on the display unit 16. FIG. 5A is a screen when only the reference light source is lighted, and data as a reference is acquired. Thereafter, when the reference light source and the another light source are lighted (in FIG. 5B, an output value of the another light source is set to 68.0 mW), new data is acquired, and this new data is displayed as shown in FIG. 5B. Then, in a case where this data is out of a standard range, setting of an output of the another light source is changed (in FIG. 5C, an output value of the another light source is changed to 71.0 mW), and the screen is changed to that in FIG. 5C. Thereafter, data is acquired again with this setting, and new data is further displayed as shown in FIG. 5D. Note that, from the left in FIGS. 5A, 5B, 5C, and 5D, an FSC-SSC plot, a view showing a flow point, and a view showing a spectrum are displayed in this order, but FIGS. 5A, 5B, 5C, and 5D is only one example of display, and the present technology is not limited to this display.

The display unit 16 can display any other items related to measurement, such as a value detected by the detection unit 12, data generated by the information processing unit 13, a reference spectrum of each channel, and an analysis result.

The fine particle measuring device 1 does not necessarily require the display unit 16, and may be connected with an external display device. As the display unit 16, for example, a display, a printer, or the like can be used.

(8) User Interface 17

The fine particle measuring device 1 according to the present technology can further include a user interface 17 that is a part to be operated by a user. The user can access the information processing unit 13 through the user interface 17 and control each unit of the fine particle measuring device 1 according to the present technology.

The fine particle measuring device 1 does not necessarily require the user interface 17, and may be connected with an external operation device. As the user interface 17, for example, a mouse, a keyboard, or the like can be used.

(9) Other

Note that, in the present technology, functions performed in each unit of the fine particle measuring device 1 according to the present technology can be stored as a program in a personal computer and hardware resources provided with a control unit including a CPU and the like, a recording medium (non-volatile memory (such as USB memory), HDD, CD, and the like), and the like, and can be functioned by a personal computer or a control unit.

<2. Fine Particle Measuring Method>

The fine particle measuring method according to the present technology is a method of at least performing a detection step and an information processing step. Specific methods to be performed in the detection step and the information processing step are respectively similar to the methods performed by the detection unit 12 and the information processing unit 13 of the fine particle measuring device 1 described above, and therefore, description thereof will be omitted here.

Figure 6:
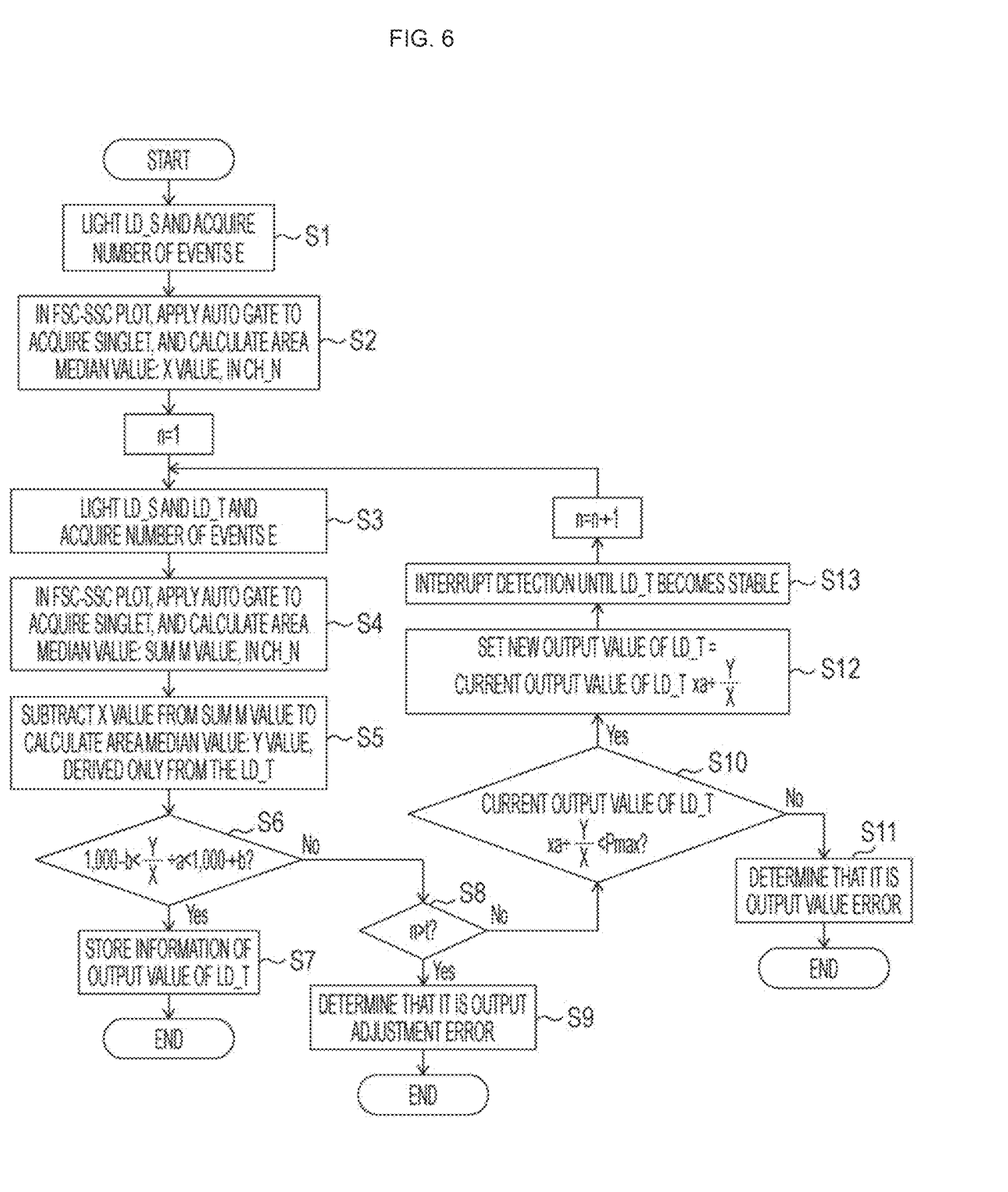
FIG. 6 is a flowchart showing one example of a fine particle measuring method according to the present technology.

One example of a flow of fine particle measurement with use of the fine particle measuring method according to the present technology will be described below with reference to FIG. 6. Note that, processing of each step of the flowchart shown in FIG. 6 is performed, for example, by each of the above-described units.

First, the information processing unit 13 lights the reference light source (LD_S) and acquires the number of events E (for example, 2,000 events) (step S1). Next, in an FSC-SSC plot, the information processing unit 13 applies Auto Gate to acquire a Singlet and calculates an Area Median value: an X value, in a specific channel (Ch_N) (step S2).

Thereafter, the information processing unit 13 sets n=1, lights the LD_S and the another light source (LD_T), and acquires the number of events E similar to the step S1 (step S3). Next, in the FSC-SSC plot, the information processing unit 13 applies Auto Gate to acquire a Singlet and calculates an Area Median value: a Sum M value, in the Ch_N (step S4). Then, the information processing unit 13 calculates an Area Median value: a Y value, derived only from the LD_T, by subtracting the X value obtained in step S2 from the Sum M value (step S5). Note that, it is assumed that the LD_S and the LD_T are coaxially installed on the fine particle measuring device 1 in step S5 in the flowchart shown in FIG. 6, but the present technology is not limited to this, but the Area Median value in the Ch_N obtained in a section of the LD_T is used as the Y value in step S5 in a case where the LD_S and the LD_T are installed with different axes.

Thereafter, for example, the information processing unit 13 determines whether or not a current output value of the LD_T is valid, on the basis of the criterion shown in the above formula (1) (step S6). In a case where the current output value of the LD_T is within an adjustment standard and the output value is valid, the storage unit 15 stores information of the output value of the LD_T (step S7), and the processing is terminated.

On the other hand, in a case where the current output value of the LD_T is out of the specification range and the output value is not valid, the information processing unit 13 determines whether or not n>t (for example, n>5) (step S8). In a case of n>t, the information processing unit 13 determines that it is an output adjustment error, and the processing is terminated (step S9). On the other hand, in a case of not n>t, it is determined whether or not it is an output value error with the above formula (2) as reference, for example (step S10).

In a case of being out of the range of the above formula (2), the information processing unit 13 determines that it is an output adjustment error (step S11), and the processing is terminated. On the other hand, in a case of being within the range of the above formula (2), the information processing unit 13 sets a new output value of the LD_T on the basis of, for example, the above formula (3), and changes an output of the LD_T (step S12).

After changing the output of the LD_T, the information procedure unit 13 interrupts detection with the detection unit 12 until the LD_T becomes stable (step S13). Specifically, for example, the information processing unit 13 controls the detection unit 12 so as to wait for three seconds until a start of the detection. Thereafter, the information processing unit 13 sets n=n+1 and returns to step S3.

Furthermore, in a case where there is another light source in addition to the LD_T, the flow shown in steps S3 to S13 is performed on the corresponding light source to perform output adjustment, similarly to the LD_T.

Note that, in the present technology, the following configuration can also be adopted.

(1)

A fine particle measuring device at least including:

at least two light sources having different wavelength regions;

a detection unit configured to detect light from a fluorescent reference particle in accordance with excitation light from the light sources; and an information processing unit configured to compare, on the basis of information detected by the detection unit, a feature quantity of an output pulse based on a reference light source among the plurality of light sources with a feature quantity of an output pulse based on at least another light source among the plurality of light sources, and adjust an output of the another light source.

(2)

The fine particle measuring device according to (1), in which the light source is a laser.

(3)

The fine particle measuring device according to (1) or (2), in which the reference light source is a laser to detect scattered light.

(4)

The fine particle measuring device according to any one of (1) to (3), in which the detection unit has a plurality of channels, and a feature quantity of an output pulse detected in a channel having a largest S/N ratio among the plurality of channels is used as a feature quantity of the output pulse.

(5)

The fine particle measuring device according to any one of (1) to (4), in which the information processing unit adjusts an output of the another light source on the basis of a preset adjustment ratio of feature quantities of the output pulses of the reference light source and the another light source.

(6)

The fine particle measuring device according to any one of (1) to (5), in which the information processing unit determines whether or not an output value after output adjustment is valid.

(7)

The fine particle measuring device according to (6), in which the information processing unit determines whether or not the output value is valid on the basis of a preset adjustment ratio of feature quantities of the output pulses of the reference light source and the another light source.

(8)

The fine particle measuring device according to (6) or (7), further including a storage unit, in which, in a case where an output value after output adjustment is valid, the storage unit stores information of the output value.

(9)

The fine particle measuring device according to any one of (6) to (8), in which, in a case where an output value after output adjustment is not valid, the information processing unit adjusts an output of the another light source again.

(10)

The fine particle measuring device according to any one of (1) to (9), in which, in a case where an output of the another light source has been changed, the information processing unit interrupts detection with the detection unit until the another light source is stabilized.

(11)

The fine particle measuring device according to any one of (1) to (10), further including a display unit, in which the display unit displays a state of output adjustment in the information processing unit.

(12)

The fine particle measuring device according to any one of (1) to (11), in which a feature quantity of the output pulse is an area of an output pulse or a height of an output pulse.

(13)

A fine particle measuring method at least including:

a detection step of detecting light from a fluorescent reference particle in accordance with excitation light from at least two light sources having different wavelength regions; and an information processing step of comparing, on the basis of information detected by the detection unit, a feature quantity of an output pulse based on a reference light source among a plurality of light sources with a feature quantity of an output pulse based on at least another light source among the plurality of light sources, and adjusting an output of the another light source.

(14)

The fine particle measuring method according to (13), in which, in the information processing step, an output of the another light source is adjusted on the basis of a preset adjustment ratio of feature quantities of the output pulses of the reference light source and the another light source set.

(15)

The fine particle measuring method according to (13) or (14), in which, in the information processing step, it is determined whether or not an output value after output adjustment is valid.

(16)

The fine particle measuring method according to (15), in which, in the information processing step, it is determined whether or not the output value is valid on the basis of a preset adjustment ratio of feature quantities of the output pulses of the reference light source and the another light source.

(17)

The fine particle measuring method according to (15) or (16), in which, in the information processing step, in a case where an output value after output adjustment is not valid, an output of the another light source is adjusted again.

(18)

The fine particle measuring method according to any one of (13) to (17), in which, in the information processing step, shifting to the detection step is not performed until the another light source is stabilized, in a case where an output of the another light source has been changed.

REFERENCE SIGNS LIST 1 fine particle measuring device
11 light source
12 detection unit
13 information processing unit
14 separation unit
15 storage unit
P passage
T substrate
16 display unit
17 user interface

The invention claimed is:

1. A fine particle measuring device, comprising:
   at least two light sources that include a first light source and a second light source, wherein
     the first light source is a reference light source,
     the first light source corresponds to a first wavelength region, and
     the second light source corresponds to a second wavelength region different from the first wavelength region;
   a detection unit configured to detect light from a fluorescent reference particle based on excitation light from the at least two light sources; and
   an information processing unit configured to:
     compare, based on the detection of the light, a feature quantity of a first output pulse with a feature quantity of a second output pulse, wherein
       the feature quantity of the first output pulse is based on the reference light source, and
       the feature quantity of the second output pulse is based on the second light source; and
     adjust an output of the second light source based on the comparison.

2. The fine particle measuring device according to claim 1, wherein each light source of the at least two light sources is a laser.

3. The fine particle measuring device according to claim 1, wherein
   the detection unit includes a plurality of channels, and
   a feature quantity of a specific output pulse in a channel having a largest S/N ratio among the plurality of channels is used as the feature quantity of the first output pulse.

4. The fine particle measuring device according to claim 1, wherein the information processing unit is further configured to adjust the output of the second light source based on a preset adjustment ratio of the feature quantity of the first output pulse and the feature quantity of the second output pulse.

5. The fine particle measuring device according to claim 1, wherein the information processing unit is further configured to determine whether an output value of the second light source after the adjustment of the output of the second light source is valid.

6. The fine particle measuring device according to claim 5, wherein the information processing unit is further configured to determine whether the output value is valid based on a preset adjustment ratio of the feature quantity of the first output pulse and the feature quantity of the second output pulse.

7. The fine particle measuring device according to claim 5, further comprising a storage unit configured to store information of the output value of the second light source, in a case where the output value after the adjustment of the output of the second light source is valid.

8. The fine particle measuring device according to claim 5, wherein, in a case where the output value after the adjustment of the output of the second light source is invalid, the information processing unit is further configured to re-adjust the output of the second light source.

9. The fine particle measuring device according to claim 1, wherein
   the second light source is stabilized at a specific time, and
   in a case where the output of the second light source is changed, the information processing unit is further configured to interrupt the detection of the light until the specific time at which the second light source is stabilized.

10. The fine particle measuring device according to claim 1, further comprising a display unit configured to display a state of the adjustment of the output of the second light source.

11. The fine particle measuring device according to claim 1, wherein the feature quantity of the first output pulse is one of an area of the first output pulse or a height of the first output pulse.

12. A fine particle measuring method, comprising:
   detecting light from a fluorescent reference particle based on excitation light from at least two light sources, wherein
     the at least two light sources include a first light source and a second light source,
     the first light source is a reference light source,
     the first light source corresponds to a first wavelength region, and
     the second light source corresponds to a second wavelength region different from the first wavelength region; and
   comparing, based on the detection of the light, a feature quantity of a first output pulse with a feature quantity of a second output pulse, wherein
     the feature quantity of the first output pulse is based on the reference light source
     the feature quantity of the second output pulse is based on the second light source; and adjusting an output of the second light source based on the comparison.

13. The fine particle measuring method according to claim 12, further comprising adjusting the output of the second light source based on a preset adjustment ratio of the feature quantity of the first output pulse and the feature quantity of the second output pulse.

14. The fine particle measuring method according to claim 12, further comprising determining whether an output value of the second light source after the adjustment of the output of the second light source is valid.

15. The fine particle measuring method according to claim 14, further comprising determining whether the output value is valid based on a preset adjustment ratio of the feature quantity of the first output pulse and the feature quantity of the second output pulse.

16. The fine particle measuring method according to claim 14, further comprising re-adjusting the output of the second light source in a case where the output value after the adjustment of the output of the second light source is invalid.

17. The fine particle measuring method according to claim 12, further comprising interrupting the detection of the light until a specific time, wherein the second light source is stabilized at the specific time, and the detection of the light is interrupted in a case where the output of the second light source is changed.

* * * * *